United States Patent
Ishibashi et al.

(10) Patent No.: US 7,787,736 B2
(45) Date of Patent: Aug. 31, 2010

(54) SEMICONDUCTOR OPTOELECTRONIC WAVEGUIDE

(75) Inventors: Tadao Ishibashi, Tokyo (JP); Seigo Ando, Tokyo (JP); Ken Tsuzuki, Musashino (JP)

(73) Assignees: NTT Electronics Corporation, Kanagawa (JP); Nippon Telegraph and Telephone Corporation, Tokyo (JP)

( * ) Notice: Subject to any disclaimer, the term of this patent is extended or adjusted under 35 U.S.C. 154(b) by 7 days.

(21) Appl. No.: 12/219,061

(22) Filed: Jul. 15, 2008

(65) Prior Publication Data

US 2008/0304786 A1    Dec. 11, 2008

Related U.S. Application Data

(62) Division of application No. 10/574,513, filed as application No. PCT/JP2004/014600 on Oct. 4, 2004, now Pat. No. 7,599,595.

(30) Foreign Application Priority Data

Oct. 3, 2003  (JP)  .............................. 2003-346285
Oct. 3, 2003  (JP)  .............................. 2003-346287

(51) Int. Cl.
    *G02B 6/10*     (2006.01)
(52) U.S. Cl. ...................... 385/131; 385/129; 385/130; 385/132; 385/1; 385/2; 385/3
(58) Field of Classification Search ...................... None
    See application file for complete search history.

(56) References Cited

U.S. PATENT DOCUMENTS 5,647,029 A    7/1997    Mihailiki et al.

(Continued)

FOREIGN PATENT DOCUMENTS

JP         03-231220        10/1991

(Continued)

OTHER PUBLICATIONS

Corvini P. J. et al.: "Model for trap filing and avalanche breakdown in semi-insulating Fe: InP" Journal of Applied Physics, American Institute of Physics. New York, US, vol. 82, No. 1, Jul. 1, 1997, p. 259 XP012042736, ISSN: 0021-8979.

(Continued)

*Primary Examiner*—Uyen-Chau N Le
*Assistant Examiner*—Chad H Smith
(74) *Attorney, Agent, or Firm*—Finnegan, Henderson, Farabow, Garrett & Dunner, LLP

(57) ABSTRACT

The present invention relates to a semiconductor optoelectronic waveguide having a nin-type hetero structure which is able to stably operate an optical modulator. On the upper and lower surfaces of the core layer determined for the structure so that electro-optical effects are effectively exerted at an operating light wavelength and are provided with intermediate clad layers having a band gap which is greater than that of the core layer 11. Respectively on the upper and the lower surface of the intermediate clad layer are provided the clad layers having the band gap which is greater than those of the intermediate clad layers. On the upper surface of the clad layer are sequentially laminated a p-type layer and an n-type layer. In the applied voltage range used under an operating state, a whole region of the p-type layer and a part or a whole region of the n-type layer are depleted.

7 Claims, 11 Drawing Sheets

U.S. PATENT DOCUMENTS

| | | | |
|---|---|---|---|
| 5,799,027 A * | 8/1998 | Anayama et al. | 372/45.01 |
| 6,198,853 B1 | 3/2001 | Yamada | |
| 2003/0156311 A1 | 8/2003 | Tada | |

FOREIGN PATENT DOCUMENTS

| | | |
|---|---|---|
| JP | 05-075212 | 3/1993 |
| JP | 05-307200 | 11/1993 |
| JP | 07-050403 | 2/1995 |
| JP | 08-335745 | 12/1996 |
| JP | 11-133367 | 5/1999 |
| JP | 2003-177368 | 6/2003 |

OTHER PUBLICATIONS

Supplementary European Search Report dated Jan. 21, 2008 in corresponding EP Patent Application No. 04792011.1.

Tsuzuki K. et al.: "40 Gbit/s n-i-n. InP Mach-Zehnder modulator with a pi voltage of 2.2V" Electronics Letters, IEE Stevenage, GB, vol. 39, No. 20, Oct. 2, 2003, pp. 1464-1466, XP006021009, ISSN: 0013-5194.

International Search Report dated Jan. 25, 2005 in PCT/JP2004/014600.

* cited by examiner

SEMICONDUCTOR OPTOELECTRONIC WAVEGUIDE

CROSS REFERENCE TO RELATED APPLICATIONS

This application is a division of application Ser. No. 10/574,513, accepted for examination under 35 U.S.C. §371 (c) on Nov. 21, 2006, now U.S. Pat. No. 7,599,595 for which benefit is claimed, which is the U.S. National Phase of PCT/JP2004/014600, filed Oct. 4, 2004, which claims priority of Japanese Application No. 2003-346285, filed Oct. 3, 2003, and Japanese Application No. 2003-346287, filed Oct. 3, 2003, all of which are incorporated herein by reference.

TECHNICAL FIELD

The present invention relates to a semiconductor optoelectronic waveguide and more specifically to a semiconductor optoelectronic waveguide having an nin-type heterostructure which enables a stable operation of an optical modulator. Further, the present invention relates to a semiconductor optoelectronic waveguide having an isolation structure for electrical signal line in an nin-type heterostructure which is used for ultrahigh-speed optical modulation at a long wavelength.

BACKGROUND ART

In recent large-capacity optical communications systems, an optical signal modulated at a high bit rate of Gbit/s or more is transmitted. As the transmission distance is extended, the signal with wavelength chirping is more significantly influenced by the fiber dispersion effects, resulting in distortion of the signal pulse shape. It is, therefore, necessary to use an optical signal which is smaller in wavelength chirping. Under these circumstances, an optical signal is generated not by direct modulation of a laser diode (LD) having an extremely large chirping, but by external modulation combining a continuous-wave operated laser diode (LD).

A typical external modulator which is used in a long distance optical transmission is an LN modulator configured with $LiNbO_3$ (LN) optoelectronic waveguide, in which an optical waveguide is coupled to an electrical waveguide. The operation principle of the LN modulator is based on the change in optical refractive index by electric field in a waveguide due to electro-optical effects, and resulting phase shift of optical signal. The above-described LN modulator is able to function as an optical phase modulator, a light intensity modulator in which a Mach Zehnder (MZ) interferometer is incorporated, or an intelligent optical switch constituted by combining many waveguides.

However, LN modulators still have many problems. Since $LiNbO_3$ is a dielectric material, a sophisticated manufacturing technology is required in stabilizing the surface of the material and processing a waveguide. It is also necessary to use a special photolithography because of relatively long in waveguide length which is different from that for semiconductor fabrication process. Further, the size of package in which an LN modulator is loaded must be made larger in dimension. Due to these reasons, the LN modulator module is higher in manufacturing cost and an optical transmitter using it is relatively large in dimension, which are problems related to a conventional modulator.

Also known are semiconductor optical modulators, the operation principle of which is similar to that of an LN modulator. For example, these include a GaAs optical modulator in which a Schottky electrode is placed on a semi-insulating GaAs to configure an optoelectronic waveguide. Another one is an InP/InGaAsP optical modulator. In this type of modulator, driving voltage is effectively applied to a core portion of a waveguide through utilization of a hetero pn junction, in addition to good optical confinement.

However, of these semiconductor optical modulators, the former (LN modulator) has a disadvantage in that electrical loss is large due to a longer waveguide length, whereas the latter (conventional semiconductor-based modulator) is disadvantageous in that a greater light absorption due to a p clad layer results in a difficulty of designing a longer waveguide for realizing low driving voltage. In recent years, as a structure to overcome these disadvantages, proposed is a modulator in which clad layers on both sides of an InP/InGaAsP optical modulator are an n-type (a so-called nin-type structure) (for example, refer to Patent Documents 1 and 2).

FIG. 9 is a view illustrating a band diagram of the semiconductor optoelectronic waveguide which constitutes a conventional InP/InGaAsP optical modulator. The symbol 101 given in the view denotes a core layer of a waveguide; 102-1 and 102-2, first clad layers; 103-1 and 103-2, a p-type and an n-type second clad layers respectively. Further, 100-1 and 100-2 denote respectively electrons and positive holes (holes). Voltage is applied to the p-type second clad layer 103-1 and the n-type second clad layer 103-2 to induce a desired electro-optical effect on the core layer 101, thereby realizing an optical modulation. In the above-described conventional waveguides, voltage is applied to the core layer 101 by a pn junction, achieving a decreased leak current. Further, carriers generated by light absorption are allowed to flow easily to electrodes, thereby realizing in a stable operation.

However, a GaAs optical modulator equipped with a Schottky electrode has a problem that an operating voltage is elevated. Further, an InP/InGaAsP optical modulator has a problem that an operating bandwidth is narrow due to transmission loss of electrical signals resulting from a higher resistance on a p-type clad layer. In addition, a greater light absorption a p-type clad layer (described above) makes it difficult to prolong the waveguide length, thereby further reducing the operating voltage of the modulator is limited. The transmission loss of electrical signals in the InP/InGaAsP optical modulator appears in the course of charge and discharge by the pn junction through the resistance of signal lines and that of the p-type second clad layer 103-1. In particular, since the resistance of the p-type second clad layer 103-1 originates from physical properties of a material that hole mobility is low it is an unavoidable problem. In view of the above-described problems, in recent years, a nin-type waveguide structure has been proposed.

FIG. 10 is a view showing a band diagram of the nin-type semiconductor optoelectronic waveguide structure. Namely, the p and n clad layers (103-1 and 103-2) on both sides of the InP/InGaAsP optical waveguide given in a FIG. 9 are changed to those of n-type, and the modulator operation is done by applying voltage between these two n-type electrode layers. The symbol 111 given in the figure denotes a core layer of the waveguide, and 112-1 and 112-2 denote the first clad layers. This is different from the constitution given in FIG. 9 in that both of the electrode layers (114-1 and 114-2) are of n-type, and the p-type second clad layer 103-1 given in FIG. 9 is replaced by a Fe-doped semi-insulating layer 115 having a deep levels 116 and an n-type electrode layer 114-1 (for example, refer to Patent Document 1). It is noted that the n-type electrode layer 114-2 is corresponding to the n-type second clad layer 103-2 given in FIG. 9, and 110-1 and 110-2 denote respectively electrons and positive holes (holes).

In the above-described constitution, a deep Fe level 116 in the semi-insulating layer 115 acts as an ionized acceptor and, therefore, the electrical charge will bend a band to form a potential barrier to electrons. As indicated by the arrow in the figure, electrons 114-1 and holes 110-2 in the vicinity of the curved portion of the band are recombined via the deep Fe level 116 in the semi-insulating layer 115. Therefore, the potential barrier can keep its profile when excess hole are induced, and suppresses leakage current by electron flow from the layer 114-1, making it possible to apply an electric field to the core layer 111.

However, in the above waveguide structure, the density of ionized Fe deep levels changes depending on a bias because the density of the deep levels 116 is not sufficiently high. Dependence of such ionization on the bias will cause a change in thickness of a depletion layer, resulting in a failure in keeping a proportional relationship between the applied voltage and the electric field involved in the core layer 111. There is also a problem that response to a high speed modulation signals is difficult due to a relatively long interval of capture and emission of carriers by the deep Fe level 116. In another words, the modulation strength has frequency dispersion.

Further, a basic concept that "voltage is applied between two n-type electrode layers to operate a device" has been known in the field of electron devices as a so-called bulk barrier diode. An example, in which such a concept is applied to an optical modulator, is reported in "the modulator which incorporates a quantum well core layer for inducing carrier band filling effects" (for example, refer to Patent Document 2). Since this optical modulator utilizes flow of electrons traveling into and out of a quantum well, it is theoretically impossible to faster operation speed, as compared with an optical modulator using electro-optical effects.

FIG. 11 is a diagram illustrating a conventional nin-type semiconductor optical modulator. The symbol 121 given in the figure denotes an n-type third semiconductor clad layer; 122, a p-type fifth semiconductor clad layer; 123, a first semiconductor clad layer; 124, a semiconductor core layer having electro-optical effects; 125, a second semiconductor clad layer; 126, an n-type fourth semiconductor clad layer; 127 and 128, n-type electrodes; 129, a grooved electrical isolation region formed by etching. There is another report about an electrically separated structure in which a semi-insulating semiconductor is grown again on the grooved etched portion (for example, refer to Patent Document 1), which is, however, not necessarily an optimal technique for providing an optical modulator because of the more complicated structure.

The p-type fifth semiconductor clad layer 122 and the first semiconductor clad layer 123 are sequentially laminated on the n-type third semiconductor clad layer 121, and the semiconductor core layer 124 having electro-optical effects is provided so as to be held between the first semiconductor clad layer 123 and the second semiconductor clad layer 125. Further, on the second semiconductor clad layer 125 is laminated the n-type fourth semiconductor clad layer 126 having the grooved electrical isolation region 129 formed by etching. On the fourth semiconductor clad layer 126 is provided the electrode 128, and on both sides of the raised portion of the third semiconductor clad layer 121 is provided the electrode 127.

In the waveguide structure given in FIG. 11, since the n-type InP clad layer 126 is partially etched in a grooved form to provide the electrical isolation region 129, an optical transmission mode is changed at a portion where a clad layer is varied in thickness, resulting in optical scattering loss. Further, in a conventional waveguide structure, the fourth semiconductor clad layer 126 is etched in a relatively deep manner, posing a problem in controlling the etching.

In a typical structure of the nin-type InP/InGaAsP optical modulator (above explained), a waveguide portion where modulation is conducted and a connecting waveguide portion outside thereof are separated electrically by partially removing a part of the upper layer of the n-type clad layer 126, thereby resulting in formation of a recess 129 on the waveguide. This recess poses a problem that optical loss increases in association with a change in the optical transmission mode at portions from a connecting waveguide to an electrical isolation region and at portions from the electrical isolation region to a main waveguide. Further, since it is necessary to leave a high resistant clad layer having a certain thickness in the electrical isolation region (recess region), the high resistant clad layer must not be reduced in thickness, thereby making it impossible to effectively apply an electric field to the semiconductor core layer 124, which is a problem.

The present invention has been made in view of the above problems. An object of the invention is to provide a semiconductor optoelectronic waveguide having a nin-type heterostructure which enables the stable operation of an optical modulator.

Another object of the present invention is to provide a semiconductor optoelectronic waveguide which less influences transmission of an optical mode than a conventional recess-forming electrical isolation region to solve a problem of optical loss, and has a structure of electrical isolation region which is well controllable and stable.

Still another object of the present invention is to solve the above-described problem that a core layer undergoes a change in voltage in a semiconductor optoelectronic waveguide such as a nin-type InP/InGaAsP optical modulator, and realize a stable operation of the semiconductor optoelectronic waveguide.

Patent Document 1: Japanese Patent Application No. 2003-177368

Patent Document 2: U.S. Pat. No. 5,647,029

DISCLOSURE OF THE INVENTION

In order to accomplish the above objects, the semiconductor optoelectronic waveguide of the present invention is provided with a first semiconductor clad layer arranged on each of one main surface and other main surface of a semiconductor core layer having electro-optical effects, a second semiconductor clad layer arranged on the first semiconductor clad layer, a pn junction layer arranged on the second semiconductor clad layer laminated on one main surface of the semiconductor core layer in which the second semiconductor clad layer side is a p-type and the side opposed to the second semiconductor clad layer is an n-type, and a third semiconductor clad layer arranged on the pn junction layer and on the second semiconductor clad layer laminated on the other main surface of the semiconductor core layer which functions as an n-type electrode layer, wherein the band gap of the first semiconductor clad layer is greater than that of the semiconductor core layer, and each of the band gap of the second semiconductor clad layer and the third semiconductor clad layer is greater than that of the first semiconductor clad layer.

According to the above-described semiconductor optoelectronic waveguide of the present invention, it is possible to easily control a band profile of an nin-type heterostructure equipped by an optoelectronic waveguide and also to provide a semiconductor optoelectronic waveguide which enables a stable operation of an optical modulator. Therefore, it is also possible to realize a more stable optical modulation, without affecting advantageous features of a semiconductor optoelectronic waveguide having the nin-type heterostructure that it can be driven at a lower voltage, thereby contributing to a smaller electric power consumption of a module and a lower manufacturing cost.

Further, the semiconductor optoelectronic waveguide of the present invention is provided with a semiconductor core layer having effective electro-optical effects, a first and a second semiconductor clad layers which vertically hold the semiconductor core layer and whose band gap is greater than that of the semiconductor core layer, a third and a fourth semiconductor clad layers which vertically hold the first and the second semiconductor clad layers and contain an n-type dopant, a fifth semiconductor layer having the first and the third semiconductor clad layers on the substrate side, which is arranged between the first semiconductor clad layer and the third semiconductor clad layer, containing a p-type dopant, and whose band gap is greater than that of the semiconductor core layer, at least one electrical isolation region formed by implanting ions to the fourth semiconductor clad layer to improve the quality of materials, and electrodes individually provided at a major region other than the electrical isolation region of the fourth semiconductor clad layer and at the third semiconductor clad layer, wherein voltage is applied to the semiconductor core layer.

According to the semiconductor optoelectronic waveguide of the present invention, it is possible to provide a semiconductor optoelectronic waveguide which less influences the transmission of an optical mode than a conventional recess-forming electrical isolation region to solve a problem of optical loss and has a structure of the electrical isolation region which is well controllable and stable. The present invention is also effective in the realization of an optical modulator using an nin-type heterostructure which can be driven at a lower voltage with good structural controllability, thereby contributing to a smaller electric power consumption of an optical modulator module and a lower manufacturing cost of the module through reduction in input optical power.

In addition, the semiconductor optoelectronic waveguide of the present invention is provided with a semiconductor core layer having electro-optical effects, a first and a second semiconductor clad layers which vertically hold the semiconductor core layer and whose band gap is greater than that of the semiconductor core layer, a third semiconductor clad layer containing an n-type dopant which is arranged under the first semiconductor clad layer, a fourth semiconductor clad layer which is arranged on the second semiconductor clad layer, a fifth semiconductor layer in which the third semiconductor clad layer and the first semiconductor clad layer are arranged on the substrate side and a p-type dopant is contained between the second semiconductor clad layer and the fourth semiconductor clad layer and whose band gap is greater than that of the semiconductor core layer, a major region of an n-type modulation waveguide formed inside a part of the fourth clad layer, an isolation region adjacent to the major region, having a p-type electrical conductivity and being in contact with an electrode common to the major region, and another electrode provided on the third semiconductor clad layer, wherein voltage is applied to the semiconductor core layer via both of the electrodes.

According to the semiconductor optoelectronic waveguide of the present invention, it is possible to suppress parasitic bipolar effects of the optoelectronic waveguide using an nin-type heterostructure and consequently to solve a problem that holes accumulated in an p-type barrier layer allow the barrier height to change, thereby causing leak current to change the core layer voltage.

The semiconductor optoelectronic waveguide of the present invention is also effective in stably realizing good performance of an optical modulator using a nin-type heterostructure characterized in that it can be driven at a lower voltage and also able to allow a higher input optical power and increase the output of an optical transmitter module.

BEST MODE FOR CARRYING OUT THE INVENTION

Hereinafter, an explanation will be made for embodiments of the present invention by referring to the figures.

First Embodiment

Figure 1A:
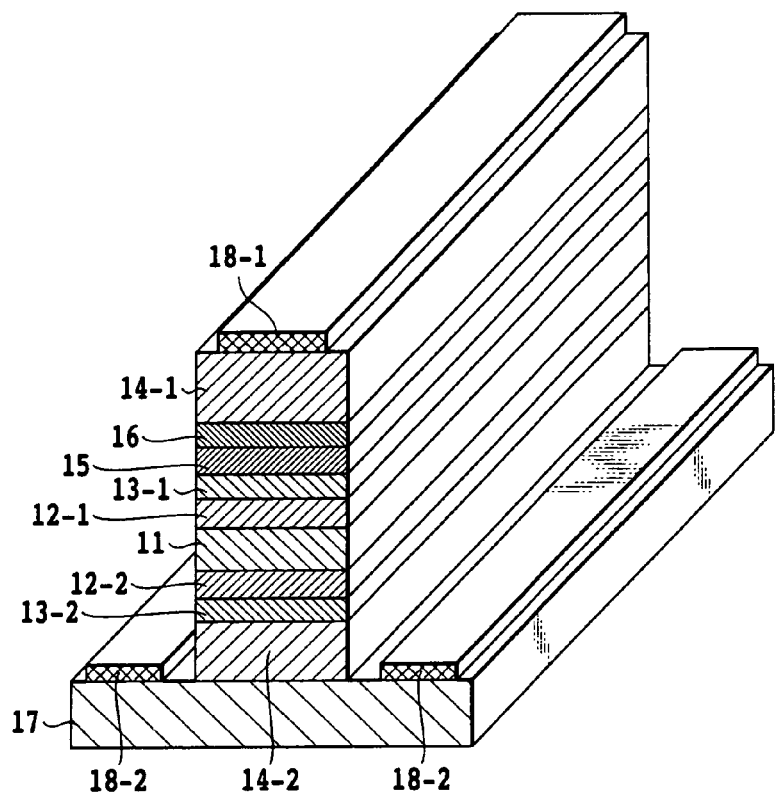
FIG. 1A is a perspective view for explaining one embodiment of the semiconductor optoelectronic waveguide according to the present invention.
Figure 1B:
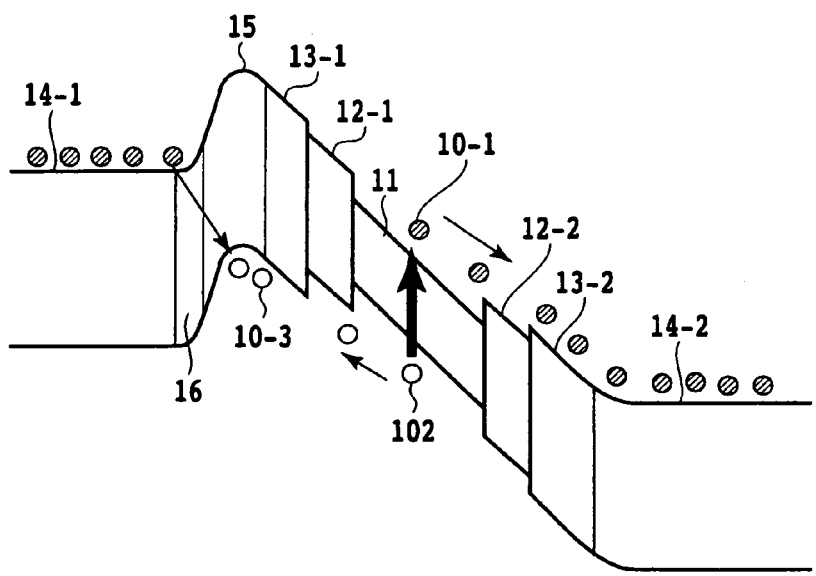
FIG. 1B is a view illustrating a band diagram of the semiconductor optoelectronic waveguide given in FIG. 1A.

FIG. 1A and FIG. 1B are configuration diagrams for explaining one embodiment of the semiconductor optoelectronic waveguide according to the present invention. FIG. 1A is a perspective view of the optoelectronic waveguide and FIG. 1B is a view illustrating the band diagram thereof. The symbol 11 given in the figure denotes a semiconductor core layer; 12-1 and 12-2, first semiconductor clad layers arranged on both main surfaces of the semiconductor core layer 11; 13-1 and 13-2, second semiconductor clad layers arranged on each of the first semiconductor clad layers 12-1 and 12-2. The symbols 14-1 and 14-2 denote third semiconductor clad layers. The symbols 15 and 16 denote respectively a p-type layer and an n-type layer, and a pn junction layer is constituted with these layers of 15 and 16.

On the second semiconductor clad layer 13-1 is arranged the p-type layer 15, and on the n-type layer 16 is arranged the third semiconductor clad layer 14-1. Further, under the second semiconductor clad layer 13-2 is arranged the third semiconductor clad layer 14-2.

The structural (and material) parameters of the core layer 11 are determined in such a way that electro-optical effect is effectively exerted at an operating light wavelength and light absorption does not pose any problem. For example, in a case of a device used in a 1.5 µm band, a quantum well layer and a barrier layer are made with InGaAlAs compounds to form a multiple-quantum well structured core layer 11, in which these layers are allowed to be different in Ga/Al compositions.

On the upper and lower surfaces of the core layer 11 are provided intermediate clad layers (12-1 and 12-2) having compositions such as InGaAlAs, whose band gap is greater than that of the core layer 11 so that carriers generated by light absorption are not trapped by a hetero interface.

Respectively on the upper surface of the intermediate clad layer 12-1 and the lower surface of the intermediate clad layer 12-2 are provided clad layers 13-1 and 13-2 having compositions such as InGaAlAs, whose band gap is greater than that of the intermediate clad layer.

On the upper surface of the clad layer 13-1 are sequentially lamented a p-type layer 15 of InGaAlAs and an n-type layer 16 of InGaAlAs, for example. In an applied voltage range used under the operating state, a whole region of the p-type InGaAlAs layer 15 and a part or a whole region of the n-type InGaAlAs layer 16 are depleted. Doping concentration profiles of these layers are determined in such a way that the potential in these depleted regions changes with sufficiently great extent or a sufficient potential barrier to electrons is induced. It is preferable that doping concentrations of these layers are $1 \times 10^{17}$ cm$^{-3}$ or greater for the p-type layer 15 and $5 \times 10^{17}$ cm$^{-3}$ or greater for the n-type layer 16. For example, the doping concentration of the p-type layer 15 is to give $2 \times 10^{17}$ cm$^{-3}$ and that of the n-type layer 16 is to give $1 \times 10^{18}$ cm$^{-3}$.

Respectively on the upper surface of the n-type InGaAlAs layer 16 and the lower surface of the clad layer 13-2 are provided n-type layers 14-1 and 14-2 having compositions such as InGaAlAs and functioning as a clad layer. On the upper surface of the n-type layer 14-1 is provided an electrode 18-1. Further, the band gap of these n-type layers 14-1 and 14-2 is designed to be greater than that of intermediate clad layers 12-1 and 12-2. Then, an n-type layer 14-2, which is the bottom layer of the laminated structure, is provided on a partial region of the main surface of an n-type electrode layer 17 having an electrode 18-2.

In order to operate the device illustrated in FIG. 1A as an optoelectronic waveguide, the waveguide is to have structures including a mesa structure, the cross section of which is as illustrated in FIG. 1A, and in a state that light is transmitted to the waveguide, an electrical signal is input from electrodes 18-1 and 18-2 to apply voltage between an n-type layer 14-1 and an n-type layer 14-2.

As apparent from FIG. 1B illustrating a band diagram on voltage application, a potential barrier formed by the presence of the p-type InGaAlAs layer 15 and the n-type InGaAlAs layer 16 suppresses leak current in association with electron injection from the n-type layer 14-1, and positive holes 10-2 generated by light absorption (although in a sparing quantity) are recombined via shallow-level acceptors and donors in the p-type InGaAlAs layer 15 and the n-type InGaAlAs layer 16, by which voltage can be applied to the core layer 11.

Figure 10:
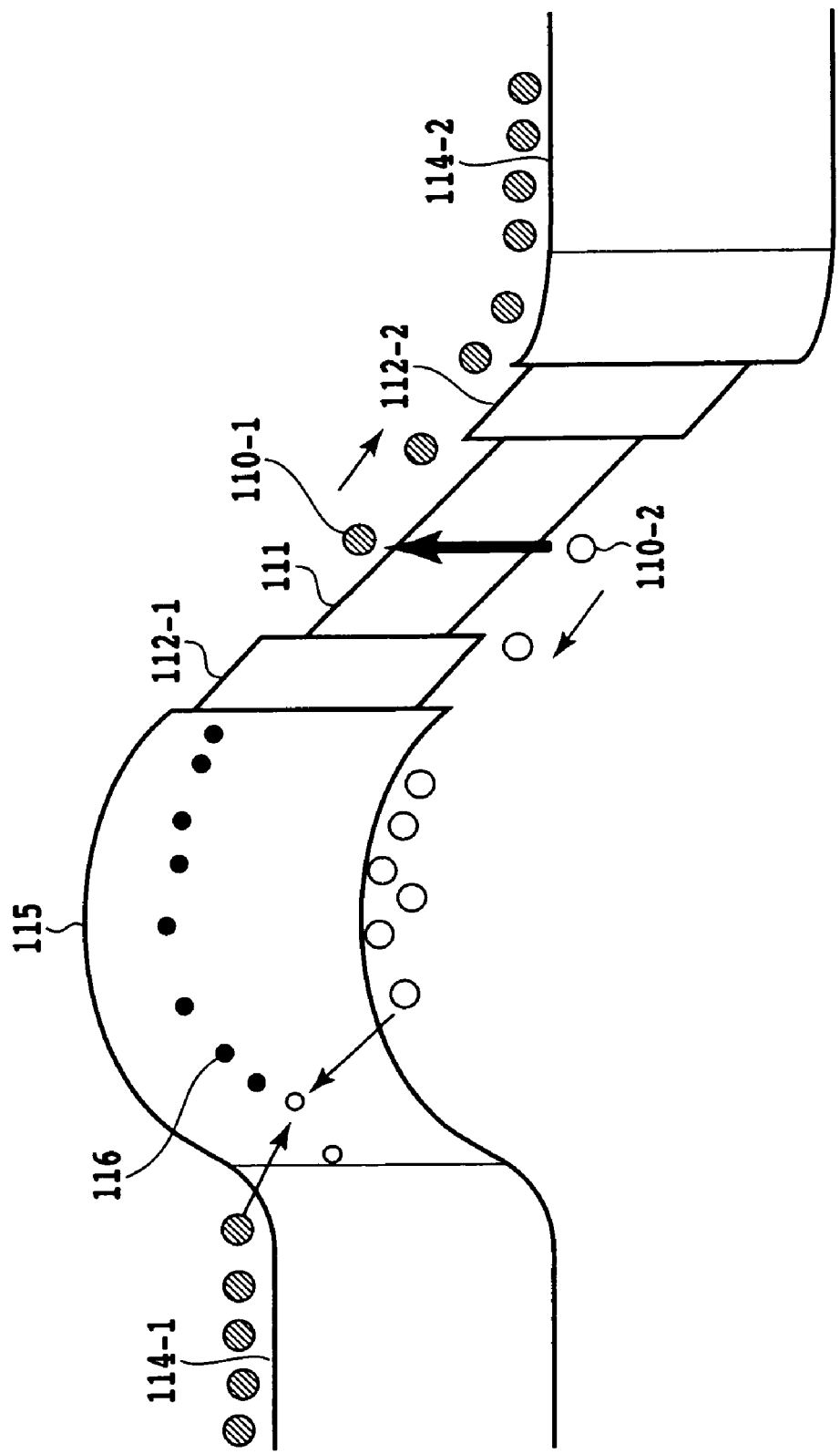
FIG. 10 is a view illustrating a band diagram of a semiconductor optoelectronic waveguide having a nin-type structure in which clad layers on both sides of the waveguide of the InP/InGaAsP optical modulator given in FIG. 9 are an n-type.

When the band diagram of FIG. 1B is compared with that of FIG. 10, it is revealed that waveguides having a conventional constitution are to induce a change in potential by ionizing a deep level, whereas the structure of the present invention is to securely control a potential configuration by determining concentrations of shallow level acceptors and donors in such a way that a desired strength of electric field is applied to the core layer 11.

Further, in FIG. 1A and FIG. 1B, a pn junction layer constituted with the p-type InGaAlAs layer 15 and the n-type InGaAlAs layer 16 is provided between the clad layer 13-1 and the n-type layer 14-1. However, instead of the above constitution, the pn junction layer may be provided between the clad layer 13-2 and the n-type layer 14-2.

Second Embodiment

Electrons 10-1 and holes 10-2 are generated by light absorption in the core layer 11 while the device functions, although in a sparing quantity. The electrons 10-1 easily reach the n-type layer 14-2, whereas the holes 10-2 may accumulate in the vicinity of the n-type InGaAlAs layer 16 having a steep band bending. Here the accumulation of holes 10-3 is factor to cause a bias sift of forward in a pn junction between the p-type InGaAlAs layer 15 and the n-type InGaAlAs layer 16, thereby pushing down a potential barrier in the region and making it difficult to apply voltage to the core layer 11. Further, they may be responsible for electron injection from the side of the n-type layer 14-1.

In the second embodiment, such accumulated positive holes 10-3 are smoothly recombined to give a layer in which the p-type InGaAlAs layer 15 and the n-type InGaAlAs layer 16 are doped at high concentrations, the pn junction is made thinner, by which electrons and accumulated holes are made closer spatially to increase a probability of recombination between the bands indicated by the arrow in FIG. 1B. Thereby, holes 10-3 generated in the core layer 11 and accumulated in the vicinity of the n-type InGaAlAs layer 16 are smoothly removed, making it possible to suppress a change in height of the potential barrier formed by the p-type InGaAlAs layer 15 and the n-type InGaAlAs layer 16.

Third Embodiment

In the semiconductor optoelectronic waveguide of the third embodiment, an impurity forming a deep level such as Fe is doped to a layer corresponding to the n-type InGaAlAs layer 16 in FIG. 1, together with a donor impurity. Further, a doped quantity of the impurity forming a deep level is established to be sufficiently lower than that of the donor impurity. According to the thus established doping, an impurity forming a deep level will not give a great influence to a band profile, whereas it elevates a recombination probability via a deep level, thereby making it possible to smoothly remove positive holes generated in the core layer 11 by light absorption.

Fourth Embodiment

Figure 2:
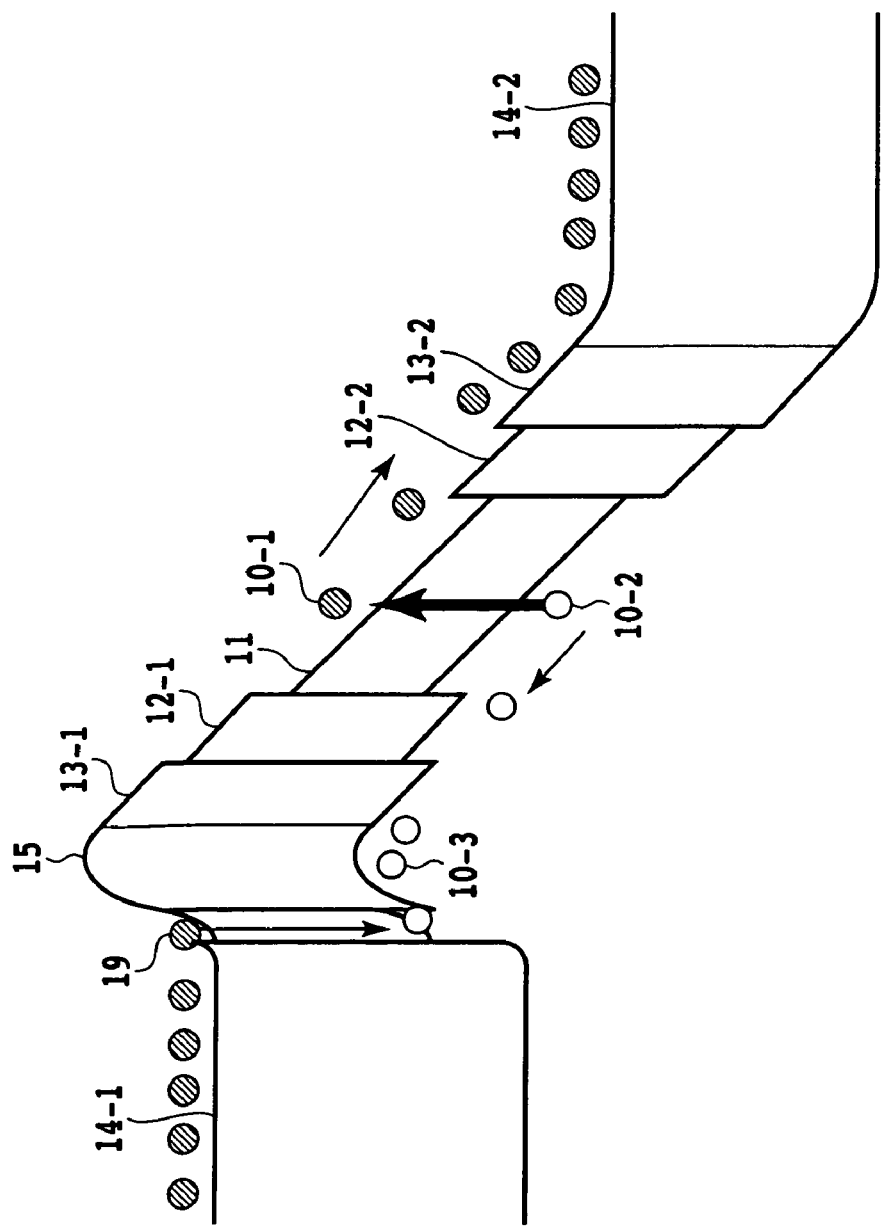
FIG. 2 is a view illustrating a band diagram of the semiconductor optoelectronic waveguide of another embodiment of the present invention.

FIG. 2 is a view illustrating a band diagram of the semiconductor optoelectronic waveguide of a fourth embodiment of the present invention, in which a layer corresponding to the n-type InGaAlAs layer 16 in FIG. 1 is given an n-type layer 19 which is smaller in band gap energy than InGaAsP. A band gap difference ($\Delta E_G$) between a p-type layer 15 such as InGaAlAs and an n-type layer 19 such as InGaAsP as well as a doping profile are formed in a desired configuration, by which some of positive holes 10-2 generated inside the core layer 11 by light absorption reach the n-type InGaAsP layer 19 (10-3) to enable a faster recombination. In this instance, it is preferable in controlling a potential configuration that valence band discontinuity between the p-type InGaAlAs layer 15 and the n-type InGaAsP layer 19 is smaller than conduction band discontinuity. This is because that the smaller the valence band discontinuity is, the more easily the holes pass through an interface between the p-type InGaAlAs layer 15 and the n-type InGaAsP layer 19.

In the explanation so far made about the present invention, InGaAlAs and InGaAsP are exemplified as components for the waveguide. However, the present invention is not restricted to these components but the family of III-V compound semiconductors including AlGaAs compounds may be used to constitute the waveguide of the present invention.

Fifth Embodiment

Figure 3:
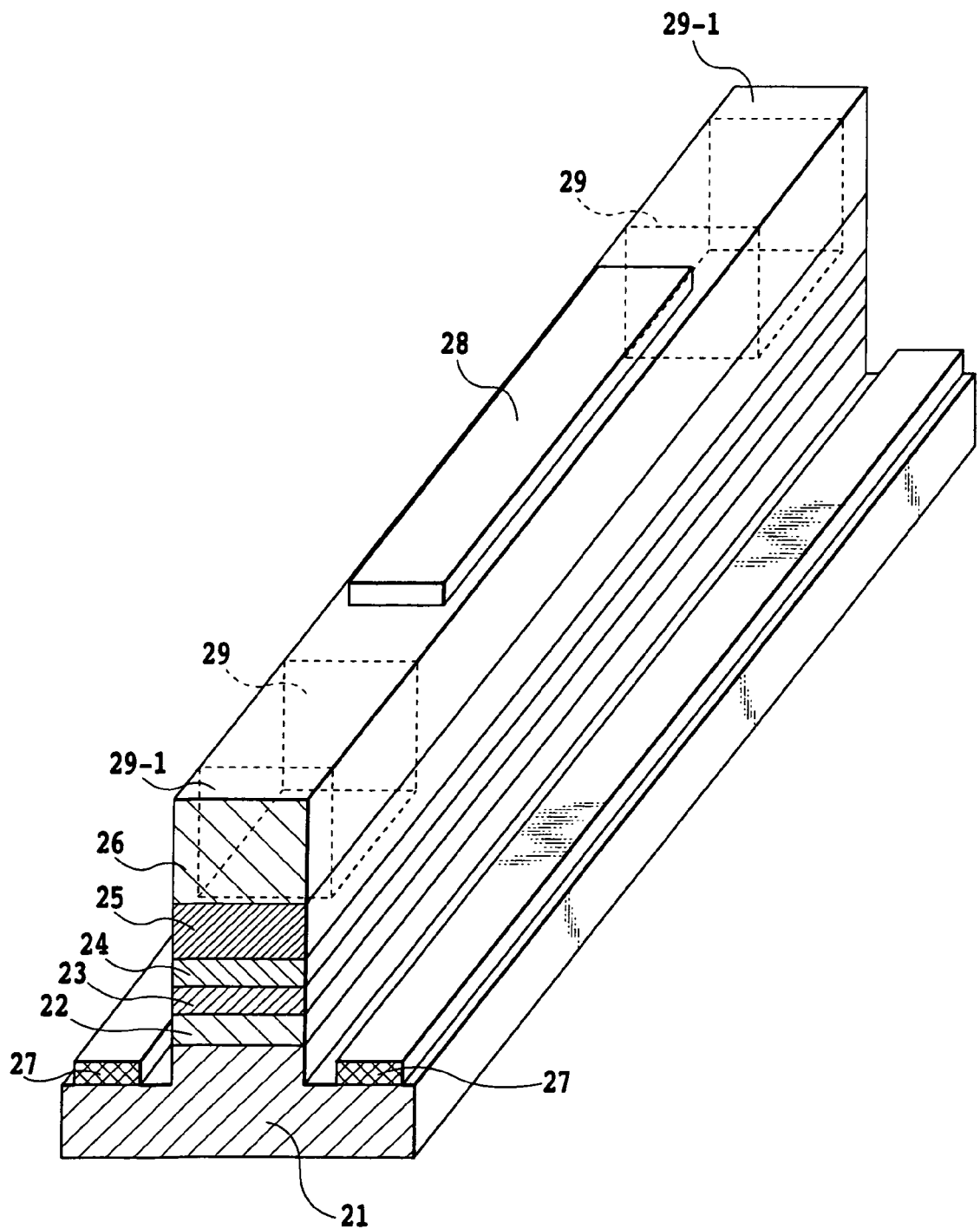
FIG. 3 is a perspective view for explaining still another embodiment of the semiconductor optoelectronic waveguide according to the present invention.

FIG. 3 is a perspective view for explaining a fifth embodiment of the semiconductor optoelectronic waveguide according to the present invention. In the figure, the symbol 21 denotes an n-type third semiconductor clad layer; 22, a p-type fifth semiconductor clad layer; 23, a first semiconductor clad layer; 24, a semiconductor core layer having electro-optical effects; 25, a second semiconductor clad layer; 26, an n-type fourth semiconductor clad layer; 27 and 28, n-type electrodes; 29, an electrical isolation region formed by ion implantation; 29-1, a connection waveguide region of the fourth semiconductor clad layer 26 with the electrical isolation region 29.

On the n-type third semiconductor clad layer 21 are sequentially laminated the p-type fifth semiconductor clad layer 22 and the first semiconductor clad layer 23. The semiconductor core layer 24 having electro-optical effects are provided so as to be held between the first semiconductor clad layer 23 and the second semiconductor clad layer 25. Further, on the second semiconductor clad layer 25 is laminated the n-type fourth semiconductor clad layer 26 having the electrical isolation region 29 formed by ion implantation. On the fourth semiconductor clad layer 26 is provided the electrode 28, and on both sides of a raised portion on the third semiconductor clad layer 21 is provided the electrode 27.

More specifically, the semiconductor optoelectronic waveguide of the present invention includes a laminated body having semiconductor heterostructure provided, at least, with the semiconductor core layer 24 having effective electro-optical effects, the first and the second semiconductor clad layers 23 and 25 which vertically hold the semiconductor core layer 24 and whose band gap is greater than that of the semiconductor core layer 24, and the third and the fourth semiconductor clad layers 21 and 26 containing an n-type dopant which vertically hold the first and the second semiconductor clad layers 23 and 25.

On the substrate side (not illustrated) are arranged the first and the third semiconductor clad layers 23 and 21. Between the first semiconductor clad layer 23 and the third semiconductor clad layer 21 is inserted the fifth semiconductor layer 22 which contains a p-type dopant and whose band gap is greater than that of the semiconductor core layer 24. Further, on the fourth semiconductor clad layer 26 is formed at least one electrical isolation region 29 by ion implantation. In addition, respectively at a major region other than the electrical isolation region 29 of the fourth semiconductor clad layer 26 and at the third semiconductor clad layer 21 are provided the individual electrodes 28 and 27 in such a structure that voltage is applied to the semiconductor core layer 24.

As described above, from the substrate side, are sequentially laminated a third InP n-type clad layer 21, a fifth InP clad layer 22 containing a p-type dopant, a first InP clad layer 23 which is ordinarily at low doping concentrations and the semiconductor core layer 24, the structure of which is determined in such a way that electro-optical effects are effectively exerted at an operating light wavelength and light absorption is kept lower not to pose any problem. In a case of a device used in a 1.5 μm band, a quantum well layer and a barrier layer, each of which is changed in Ga/Al compositions of InGaAlAs, are used to form a multiple quantum well structure.

Further, on the semiconductor core layer 24 are arranged a second InP clad layer 25 which is at low doping concentrations and a fourth InP n-type clad layer 26. A positive applied voltage is given to the electrode 28 with respect to the electrode 27 to modulate an optical phase on the basis of electro-optical effects. In an applied voltage range used under the operating state, the fifth InP clad layer 22 through the second InP clad layer 25 are completely depleted and the n-type third InP n-type clad layer 21 and the fourth semiconductor clad layer 26 are partially depleted. Since the fifth InP clad layer 22 is p-type, it acts as a potential barrier to electrons.

In order to allow the device to function as an optoelectronic waveguide, while light is transmitted in a direction perpendicular to the cross section of a mesa structure as illustrated in FIG. 3, an electrical signal is input to the electrode 28 to give a state that voltage is applied between the third InP n-type clad layer 21 and the second InP clad layer 25. When an optoelectronic waveguide is used as an optical modulator, it is usually necessary that a connection waveguide is arranged at an optical modulation waveguide portion where voltage is applied from the electrode 28 and on a light input/output side of the optical modulation waveguide portion to provide an electrical separation between them.

In the semiconductor optoelectronic waveguide of the fifth embodiment, a part of the fourth InP n-type clad layer is formed by ion implantation at a portion indicated by the symbol 29 to give a p-type region (electrical isolation region) surrounded by a high-resistance region or a pn junction.

It is noted that the fifth embodiment is characterized in that the fifth InP clad layer 22 which is doped to be p-type so as to act as a potential barrier to electrons is arranged below. The layer is to prevent a possible influence on the temperature distribution of ionized acceptors which create the potential barrier by crystalline defects on ion implantation. In other words, it is to prevent an increased leak current of junction resulting from deteriorated configuration of the potential barrier when bias is applied.

Further, in the constitution of the fifth embodiment, an atom such as Be which forms an acceptor in InP or an atom which forms a deep donor/acceptor pair level is used as an ion species implanted into an electrical isolation region 29. Where the electrical isolation region 29 results in a p-type, the portion concerned is about 30 times higher in electric resistance than an n-type layer which is doped in a similar quantity. Therefore, even where the portion is not made into a high-resistance layer, it is possible to prevent a decreased modulation efficiency resulting from transmission of an input electrical signal to the electrical isolation region 29. As a matter of course, the high resistance layer is desirable, but only a change from n-type to p-type is able to improve the function of electrical separation.

Figure 11:
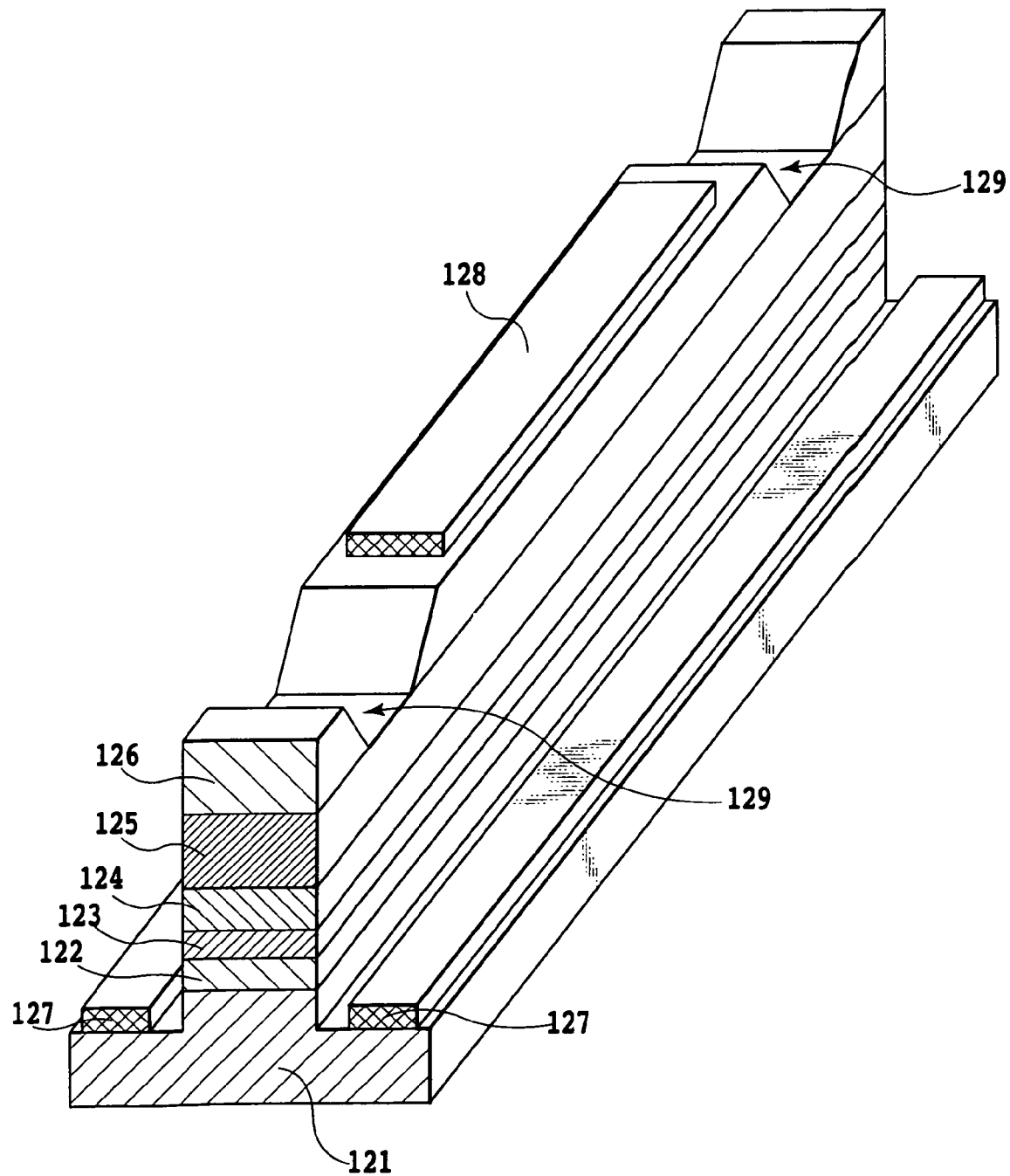
FIG. 11 is a perspective view for explaining a semiconductor optical modulator having a conventional nin-type structure.

In the conventional waveguide structure illustrated in FIG. 11, since an n-type InP clad layer 126 is partially etched in a grooved form to provide an electrical isolation region 129, an optical transmission mode is changed at a portion where a clad layer changes in thickness, resulting in an optical scattering loss. However, the structure of the fifth embodiment will not cause the optical scattering loss in association with a change in optical transmission mode. Further, in the conventional waveguide structure, the fourth semiconductor clad layer 126 is etched to a relatively deep extent, thereby posing a problem in controlling the etching. However, the structure of the fifth embodiment does not pose the problem. Consequently, the structure of the fifth embodiment is to improve a problem related to a conventional optoelectronic waveguide resulting from formation of an electrical isolation region, making it possible to increase the output of an optical modulator by decreasing an optical loss and also to easily control the structure when devices are manufactured.

Sixth Embodiment

Figure 4:
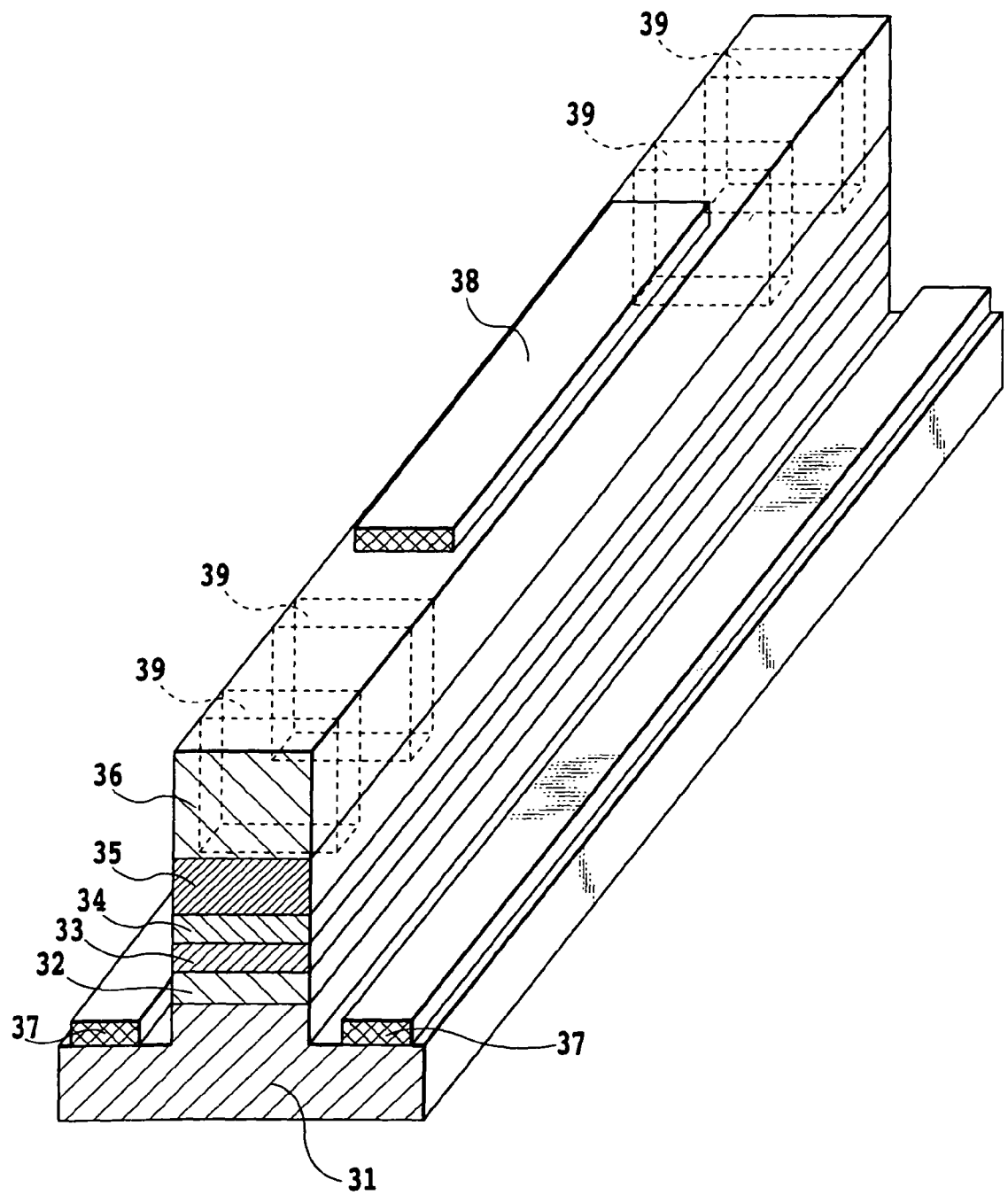
FIG. 4 is a perspective view for explaining still another embodiment of the semiconductor optoelectronic waveguide according to the present invention.

FIG. 4 is a perspective view for explaining a sixth embodiment of the semiconductor optoelectronic waveguide according to the present invention. The symbol 31 given in the figure denotes an n-type third semiconductor clad layer; 32, a p-type fifth semiconductor clad layer arranged on the third semiconductor clad layer 31; 33, a first semiconductor clad layer arranged on the fifth semiconductor clad layer 32; 34, a semiconductor core layer arranged on the first semiconductor clad layer 33 and having electro-optical effects; 35, a second semiconductor clad layer arranged on the semiconductor core layer 34; 36, an n-type fourth semiconductor clad layer arranged on the second semiconductor clad layer 35; 37 and 38, n-type electrodes; 39, an electrical isolation region made up of a plurality of pn junctions formed by ion implantation. It is noted that laminated structures other than an electrical isolation region 39 are similar to those given in the fifth embodiment of FIG. 3.

In the above-described fifth embodiment, one electrical isolation region 29 is provided on each side of the fourth InP n-type clad layer 26, whereas in the sixth embodiment, many ion implantation regions are connected to give an electrical isolation region 39. Where an ion implantation portion is to give a p-type layer, it assumes a configuration in which pn junctions are connected in series as a whole electrical isolation region, thereby decreasing the voltage on each pn junction to reduce leak current at the electrical isolation region.

In general, lattice defects remain in a pn junction formed by ion implantation and recombination current (leak current) tends to flow therein. The above described electrical separation layer structure becomes effective in this instance.

Seventh Embodiment

Figure 5:
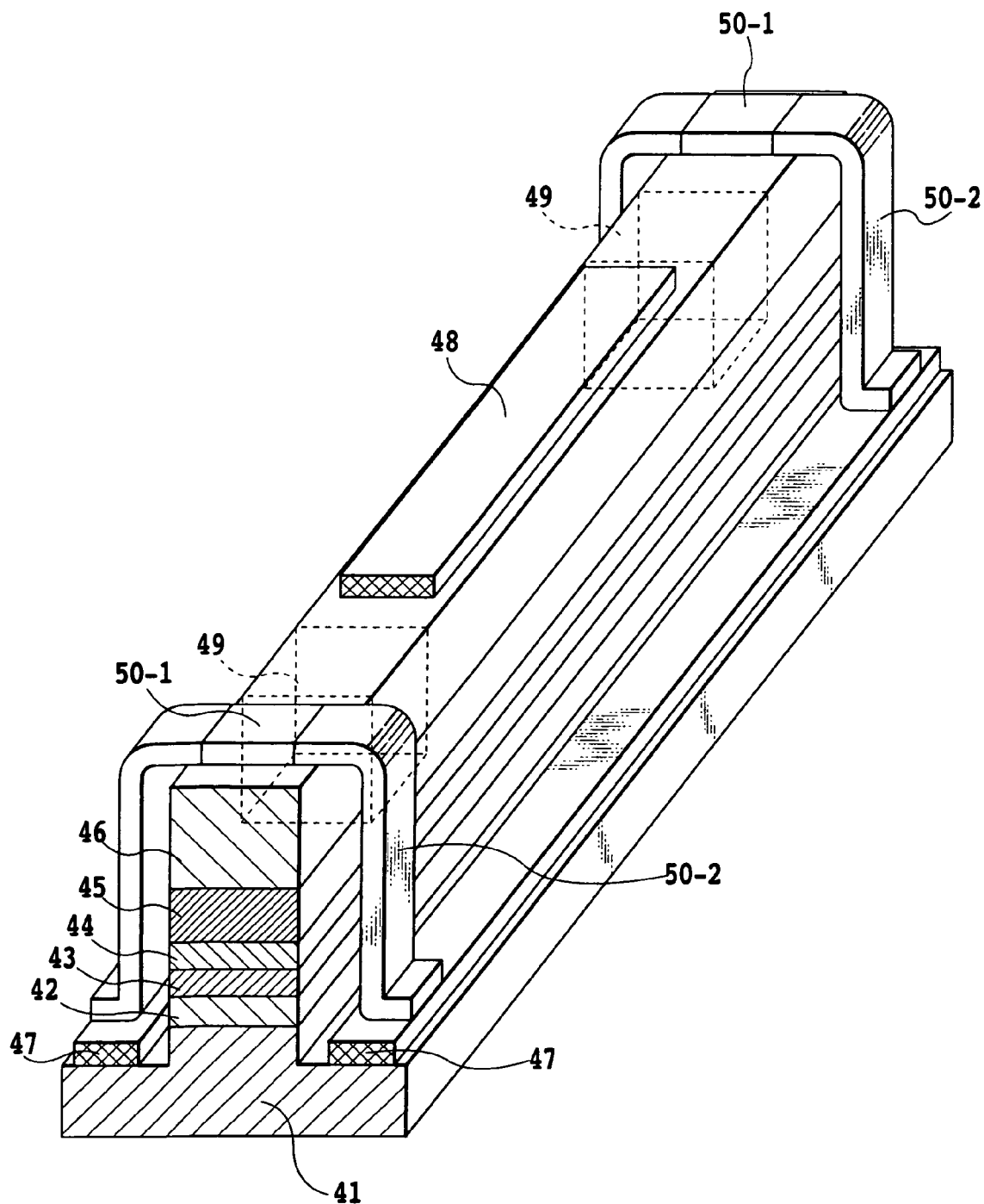
FIG. 5 is a perspective view for explaining still another embodiment of the semiconductor optoelectronic waveguide according to the present invention.

FIG. 5 is a perspective view for explaining a seventh embodiment of the semiconductor optoelectronic waveguide according to the present invention. The symbol 41 given in the figure denotes an n-type third semiconductor clad layer; 42, a p-type fifth semiconductor clad layer arranged on the third semiconductor clad layer 41; 43, a first semiconductor clad layer arranged on the fifth semiconductor clad layer 42; 44, a semiconductor core layer arranged on the first semiconductor clad layer 43 and having electro-optical effects; 45, a second semiconductor clad layer arranged on the semiconductor core layer 44; 46, an n-type fourth semiconductor clad layer arranged on the second semiconductor clad layer 45; 47 and 48, n-type electrodes; 49, an electrical isolation region formed by ion implantation; 50-1, an electrode formed in an n-type fourth semiconductor clad layer; 50-2, an electric wiring in which an electrode formed in the n-type fourth semiconductor clad layer is made at the same potential with the third clad layer. It is noted that laminated structures other than the n-type electrode 50-1 and the electric wiring 50-2 are similar to those of the firth embodiment given in FIG. 3.

The n-type electrode 50-1 is formed on the fourth semiconductor clad layer 46 at the portion that is opposed to an optical modulation waveguide portion across the electrical isolation region 49, and connected by the electric wiring 50-2, thereby making the potential the same as that of the third semiconductor clad layer 41. Where the electrical isolation region is not sufficiently high in resistance, such a problem is removed that the potential outside the electrical isolation region 49 is elevated to result in application of bias voltage to portions other than a main waveguide portion.

More specifically, the present invention is effective in stably realizing features of an optical modulator using a nin-type heterostructure which can be driven at a low voltage and able to contribute to a smaller electric power consumption of an optical modulator module and a lower manufacturing cost of the module through reduction in input optical power. It is noted that in the embodiments so far described, InP and InAlGaAs are exemplified as semiconductor materials for a semiconductor optoelectronic waveguide. However, the present invention is not restricted thereto but also applicable to an optoelectronic waveguide structure in which other family of III-V compound semiconductors including AlGaAs and InGaAsP compounds are used.

Eighth Embodiment

In the semiconductor optoelectronic waveguide of the fifth embodiment as illustrated in FIG. 3, an n-type is given to clad layers on both sides of the InP/InGaAsP optical modulator (a so-called nin-type structure). In this constitution, when voltage is applied to a core layer 24, it is necessary to provide a barrier layer to electrons so that electron current will not flow. A semiconductor clad layer 22 into which a p-type doping layer is introduced is inserted below the core layer 24 as the barrier layer. Both sides of an n-type clad layer 26 above the core layer 24 are given a p-type layer which is used as an electrical separation layer 29. It is noted that the symbol 21 denotes an n-type third semiconductor clad layer; 23, a first semiconductor clad layer; 25, a second semiconductor clad layer; 29-1, a connection waveguide region of the fourth semiconductor clad layers 26 and 29; 27 and 28, electrodes.

A waveguide structure of the nin-type InP/InGaAsP optical modulator illustrated in FIG. 3 has excellent features that the modulator can be driven at a low voltage. However, there is found a phenomenon (parasitic phototransistor effect) that the core layer 24 has a light absorption although in a sparing quantity, holes generated therein accumulate on the barrier layer 22, thereby resulting in reduction in barrier height to electrons to generate leak current. This is another problem to be solved. More specifically, with reference to transistor operation, when base-hole concentrations are elevated, with a base kept open, an emitter/base junction is kept in a forward bias state. Further, voltage applied to the core layer 24 is lowered only by voltage of the forward bias, resulting in a change in modulation characteristics by light wavelength and light intensity, thereby restricting the applications as a modulator.

Figure 6:
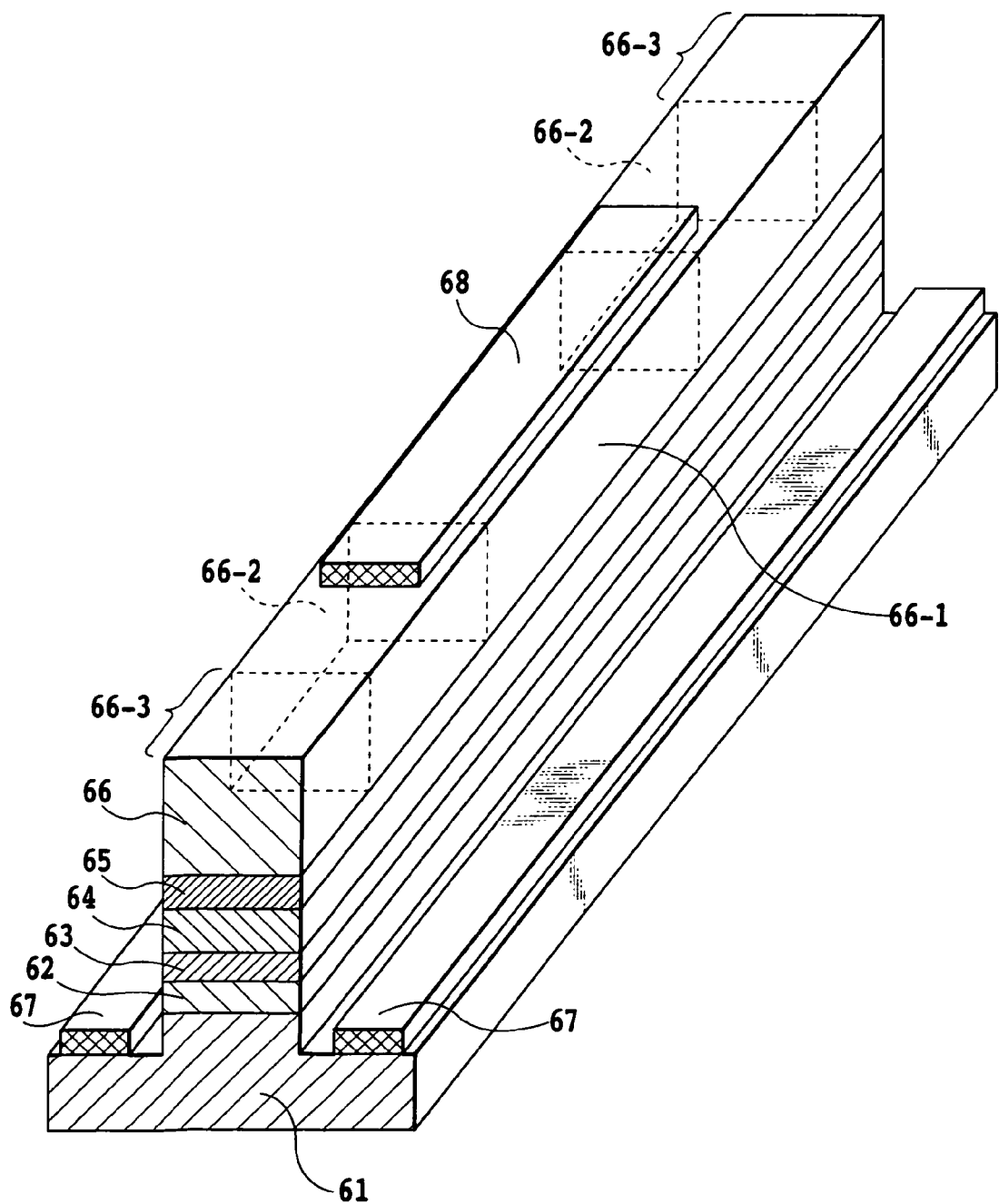
FIG. 6 is a perspective view for explaining still another embodiment of the semiconductor optoelectronic waveguide according to the present invention.

FIG. 6 is a perspective view for explaining an eighth embodiment of the semiconductor optoelectronic waveguide according to the present invention. The symbol 61 given in the figure denotes a third semiconductor clad layer; 62, a first semiconductor clad layer arranged on the third semiconductor clad layer 61; 63, a semiconductor core layer arranged on the first semiconductor clad layer 62; 64, a second semiconductor clad layer arranged on the semiconductor core layer 63; 65, a fifth semiconductor clad layer arranged on the second semiconductor clad layer 64; 66, a fourth semiconductor clad layer arranged on the fifth semiconductor clad layer 65; 66-1, an optical modulation region; 66-2, an isolation region; 66-3, a connection waveguide region; 67 and 68, electrodes.

First, an explanation will be made about a substrate side (not illustrated). The third semiconductor clad layer 61 is an n-type third InP n-type clad layer, the first semiconductor clad layer 62 is a first InGaAlAs clad layer whose band gap is smaller than that of InP at lower doping concentrations. The material and dimension of the semiconductor core layer 63 is determined in such a way that electro-optical effects are effectively exerted at an operating light wavelength and light absorption is kept lower not to pose any problem. In a case of the device used in a 1.5 μm band, a quantum well layer and a barrier layer, each of which is changed in Ga/Al compositions of InGaAlAs, are used to form a multiple quantum well structure.

The second semiconductor clad layer 64 is a second InGaAlAs clad layer whose bang gap is smaller than that of InP at low doping concentrations and in which a p-type InP barrier layer 65 (fifth semiconductor clad layer) is arranged on the clad layer 64.

The fourth InP clad layer 66 is constituted with three regions. The optical modulation region 66-1 is constituted with an n-type InP layer and the isolation region 66-2 is a p-type InP region, whose bottom surface is in contact with the p-type InP barrier layer 65. The p-type InP region 66-2 is formed, for example, by removing a portion corresponding to the isolation region 66-2 by etching to grow again a p-type InP after growth of the third semiconductor clad layer 61 to the fourth semiconductor clad layer 66 or by introducing a Be acceptor into a part of the fourth semiconductor clad layer 66 through ion implantation. The connection waveguide region 66-3 is an InP formed irrespective of a conductive configuration.

Electrodes 67 and 68 are metal electrodes, and voltage is applied to the core layer 63, with one electrode 68 being negative polarity to the other electrode 67. The metal electrode 68 is in electrical contact with both the optical modulation region 66-1 and the isolation region 66-2. In an applied voltage range used under an operating state, the first semiconductor clad layer 62 just under the optical modulation region through the fifth semiconductor clad layer 65 are all determined with doping concentrations so that an n-type neutrality is substantially maintained, excluding a depleted portion which is a part of the interface between the n-type InP clad layer 66-1 and the p-type InP barrier layer 65.

In order to allow the device illustrated in FIG. 6 to function as an optoelectronic waveguide, while light is transmitted in a direction perpendicular to the cross section of a mesa structure as illustrated in FIG. 6, an electrical signal is input to an electrode 68 to apply voltage between an n-type third InP n-type clad layer 61 and an n-type InP optical modulation region 66-1. In this instance, since the InP barrier layer 65 is p-type and functions as a potential barrier to electrons, electron injection from the optical modulation region 66-1 is suppressed and voltage is applied to the core layer 63 in a state that leak current is generated less, thereby making it possible to modulate an optical phase on the basis of electro-optical effects.

When an optoelectronic waveguide is used as an optical modulator, it is usually necessary that a connection waveguide region 66-3 is arranged at an optical modulation region where voltage is applied and on the light input/output side of the optical modulation region to provide an electrical separation between them. In the structure of the present embodiment, a portion indicated by the isolation region 66-2 in FIG. 6 is selectively given a p-type region (p-type InP region), which is used as an electrical isolation region.

Introduction of the p-type InP region 66-2 electrically connected to the n-type InP clad layer 66-1 has the following actions. Namely, in the waveguide structure as illustrated in FIG. 3, as described above, a parasitic phototransistor effect results in association with holes generated by light absorption of the core layer 24. However, in the structure of the present embodiment, since the p-type InP region (isolation region) 66-2 is lower in potential than a depleted barrier layer 65, holes flow into the p-type InP region (isolation region) 66-2, thereby preventing accumulation of holes inside the barrier layer 65.

Ninth Embodiment

Figure 7:
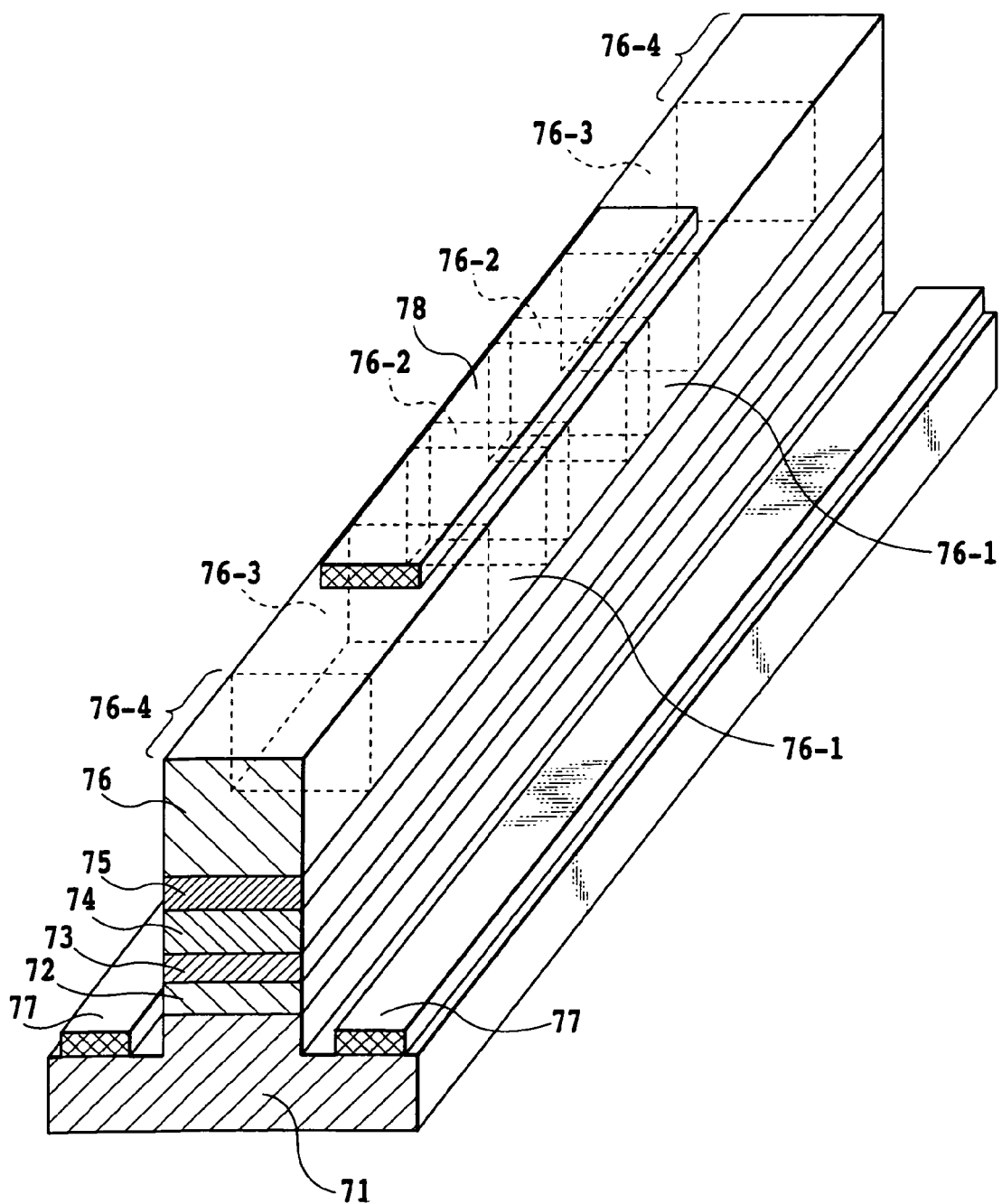
FIG. 7 is a perspective view for explaining still another embodiment of the semiconductor optoelectronic waveguide according to the present invention.

FIG. 7 is a perspective view for explaining a ninth embodiment of the semiconductor optoelectronic waveguide according to the present invention. In the above described eighth embodiment of the present invention, the p-type InP region 66-2 is arranged on both sides of the optical modulation region 66-1. When the waveguide is made longer, holes generated by light absorption does not effectively flow into the p-type InP region 66-2. In order to prevent the failure of this hole flow, as illustrated in the structure of the ninth embodiment of the present invention given in FIG. 7, many p-type InP regions 76-2 may be arranged inside the optical modulation region.

As with the eighth embodiment, these regions 76-2 are in electrical contact with the n-type InP region 76-1. In this instance, when the p-type InP region 76-2 is made shorter in a longitudinal direction, it is possible to suppress an increase in light absorption by introduction of the p-type layer to the least possible extent, while keeping the effect of hole absorption. Further, an electrode 78 is connected to each of the p-type InP regions 76-2, giving the same potential to these regions 76-2. Therefore, these regions will not adversely affect transmission of an electrical signal.

The symbol 71 denotes an n-type third semiconductor clad layer; 72, a first semiconductor clad layer arranged on the third semiconductor clad layer 71; 73, a semiconductor core layer arranged on the first semiconductor clad layer 72 and having electro-optical effects; 74, a second semiconductor clad layer arranged on the semiconductor core layer 73; 75, a p-type fifth semiconductor clad layer arranged on the second semiconductor clad layer 74; 76, a fourth semiconductor clad layer arranged on the fifth semiconductor clad layer 75; 76-3, a p-type region (isolation region) of the fourth semiconductor clad layer; 76-4, a connection waveguide region of the fourth semiconductor clad layer; 77, an n-type electrode.

Tenth Embodiment

Figure 8:
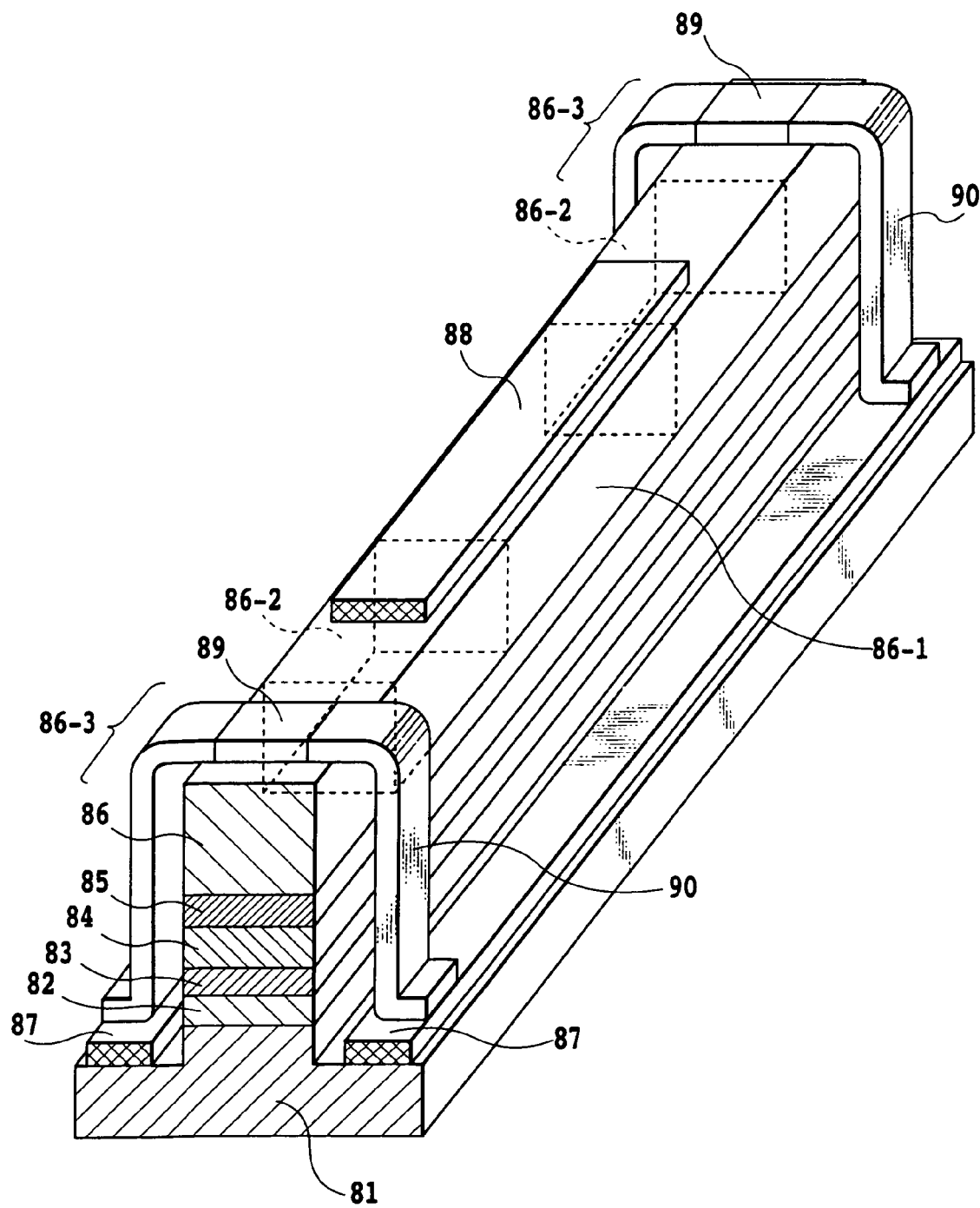
FIG. 8 is a perspective view for explaining still another embodiment of the semiconductor optoelectronic waveguide according to the present invention.
Figure 9:
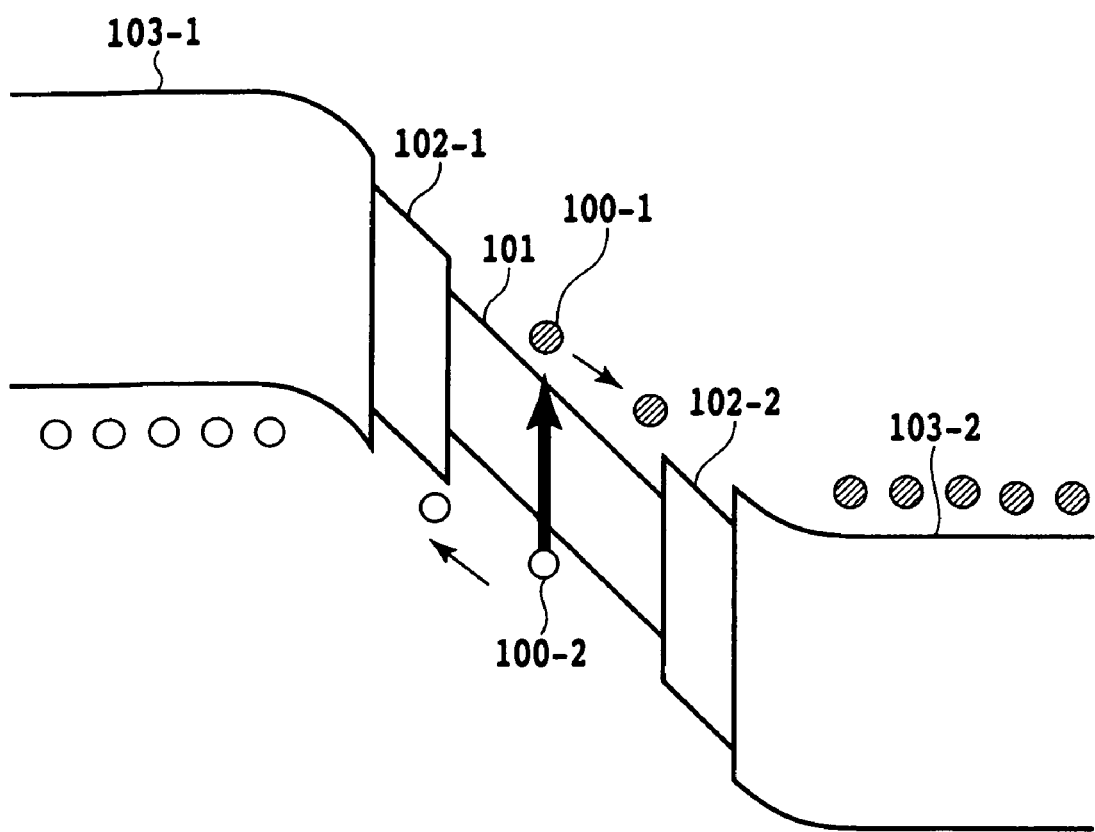
FIG. 9 is a view illustrating a band diagram of a semiconductor optoelectronic waveguide which constitutes a conventional typical InP/InGaAsP optical modulator.

FIG. 8 is a perspective view for explaining a tenth embodiment of the semiconductor optoelectronic waveguide according to the present invention. The symbol 81 given in the figure denotes an n-type third semiconductor clad layer; 82, a first semiconductor clad layer arranged on the third semiconductor clad layer 81; 83, a semiconductor core layer arranged on the first semiconductor clad layer 82 and having electro-optical effects; 84, a second semiconductor clad layer arranged on the semiconductor core layer 83; 85, a p-type fifth semiconductor clad layer arranged on the second semiconductor clad layer 84; 86, a fourth semiconductor clad layer arranged on the fifth semiconductor clad layer 85; 86-1, an n-type region (optical modulation region) of the fourth semiconductor clad layer; 86-2, a p-type region (isolation region) of the fourth semiconductor clad layer; 86-3, a connection waveguide region of the fourth semiconductor clad layer; 87 and 88, n-type electrodes; 89, an electrode formed at a connection waveguide portion of the fourth semiconductor clad layer; 90, an electric wiring in which a connection waveguide portion of the fourth semiconductor clad layer is made at the same potential with the third clad layer.

The semiconductor optoelectronic waveguide of the tenth embodiment is constituted in such a way that the electrode 89 is respectively formed on the fourth clad layer (connection waveguide portion) 86-3 which is opposed to the optical modulation region 86-1 across the p-type InP region 86-2 functioning as an electrical isolation region and the electric wiring 90 is connected between the electrode 89 and the electrode 87 on the third semiconductor clad layer 81, by which the connection waveguide region 86-3 is made at the same potential with the third clad layer 81.

The above-described constitution is able to remove a problem that when the electrical isolation region 86-2 is not sufficiently high in resistance, potential outside the electrical isolation region is elevated to result in application of bias voltage to portions other than major waveguide portions. A conductive configuration of the above-described connection waveguide region may be a p-type, an n-type or a depleted layer. In any case, no type will not develop a state where a forward bias is given between the connection waveguide region and the optical modulation region so that electric current flows.

Other Embodiments

It is also effective that the ninth embodiment is combined with the tenth embodiment in the present invention. Further, in the eighth, ninth and tenth embodiments of the present invention, InP and InAlGaAs are exemplified as materials. However, the present invention is also applicable to an optoelectronic waveguide structure in which other family of III-V compound semiconductors including AlGaAs and InGaAsP compounds are used. Therefore, the embodiments of the present invention are not restricted to those described above but include substitution of materials and others, change in configuration and number of components and a simple combination of known parts and disclosed technology, as long as they are in the range of the patent claims hereof.

It is noted that a method for integrating the semiconductor optoelectronic waveguide of the present invention with a semiconductor laser is, as a matter of course, technically the same with a known method for integrating an electric field absorption-type optical modulator with a semiconductor laser.

INDUSTRIAL APPLICABILITY

The present invention relates to a semiconductor optoelectronic waveguide having an isolation structure for electrical signal line in an nin-type heterostructure optoelectronic waveguide, which is used in an ultrahigh-speed optical modulator at a long wavelength region. Further, the present invention is able to provide a semiconductor optoelectronic waveguide which can less influence the transmission of an optical mode than a conventional recess-formed electrical isolation region to solve a problem of optical loss and which has a structure of electrical isolation region which is well controllable and stable. The semiconductor optoelectronic waveguide of the present invention is applicable to an ultrahigh-speed optical modulator at a long wavelength region and expected to make a great contribution to high-speed optical network communications systems and the like.

The invention claimed is:

1. A semiconductor optoelectronic waveguide comprising:
an upper electrode layer;
a lower electrode layer;
a semiconductor core layer arranged between said upper and lower electrode layers, the semiconductor core layer having electro-optical effects;
a first semiconductor clad layer arranged between said lower electrode layer and said core layer;
a second semiconductor clad layer arranged between said upper electrode layer and said core layer, wherein the band gap of said first and second semiconductor clad layers is greater than that of said semiconductor core layer;
a third semiconductor clad layer containing an n-type dopant which is arranged between said first semiconductor layer and said lower electrode layer;
a fourth semiconductor clad layer which is arranged between the second semiconductor clad layer and said upper electrode layer; and
a fifth semiconductor layer having a p-type dopant contained between the second semiconductor clad layer and the fourth semiconductor clad layer and whose band gap is greater than that of the semiconductor core layer, wherein said fourth semiconductor clad layer has:
a major region of an n-type modulation waveguide formed as an inside part of the fourth semiconductor clad layer; and
an isolation region adjacent to the major region having a p-type electrical conductivity, wherein said upper electrode layer is in contact with said isolation region and said major region, and said lower electrode layer is provided on the third semiconductor clad layer, and whereby voltage may be applied to the semiconductor core layer via said upper and lower electrode layers.

2. The semiconductor optical modulation waveguide according to claim 1, wherein a part of the major region of the n-type modulator waveguide inside the fourth semiconductor clad layer includes a region having a p-type electrical conductivity and the p-type electrical conductivity region of the fourth semiconductor clad layer is in contact with the lower electrode layer.

3. The semiconductor optoelectronic waveguide according to claim 2, wherein a pair of electrodes are provided on an upper surface of the fourth semiconductor clad layer above the major region and, wherein each of the electrodes in the pair is connected to said lower electrode layer.

4. The semiconductor optoelectronic waveguide according to claim 1, wherein a pair of electrodes are provided on an upper surface of the fourth semiconductor clad layer above the major region and, wherein each of the electrodes in the pair is connected to said lower electrode.

5. The semiconductor optical modulation waveguide according to claim 1, wherein the fourth semiconductor clad layer, the fifth semiconductor layer, the second semiconductor clad layer, the semiconductor core layer, and the first semiconductor clad layer are vertically arranged between the third semiconductor clad layer and the upper electrode layer.

6. The semiconductor optical modulation waveguide according to claim 1, wherein the fourth semiconductor clad layer, the fifth semiconductor layer, the second semiconductor clad layer, the semiconductor core layer, and the first semiconductor clad layer are vertically arranged between the third semiconductor clad layer and the upper electrode layer, and the lower electrode layer is formed on a portion of an upper surface of the third semiconductor clad layer where the first semiconductor clad layer is not arranged.

7. The semiconductor optical modulation waveguide according to claim 1, wherein the upper electrode layer, lower electrode layer, semiconductor core layer, first semiconductor clad layer, second semiconductor clad layer, third semiconductor clad layer, fourth semiconductor clad layer, and fifth semiconductor layer are arranged such that light is received in a direction perpendicular to a cross section direction of the semiconductor optical modulation waveguide.

* * * * *